United States Patent
Dadalas et al.

(10) Patent No.: US 11,193,037 B2
(45) Date of Patent: Dec. 7, 2021

(54) TETRAFLUOROETHYLENE POLYMER DISPERSIONS STABILIZED WITH ALIPHATIC NON-IONIC SURFACTANTS

(71) Applicant: 3M INNOVATIVE PROPERTIES COMPANY, St. Paul, MN (US)

(72) Inventors: Michael C. Dadalas, Eggenfelden (DE); Klaus Hintzer, Kastl (DE); Arnd Kurz, Neuss (DE); Tilman C. Zipplies, Burghausen (DE); Kai Helmut Lochhaas, Neuötting (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 602 days.

(21) Appl. No.: 15/115,235

(22) PCT Filed: Jan. 29, 2015

(86) PCT No.: PCT/US2015/013411
§ 371 (c)(1),
(2) Date: Jul. 28, 2016

(87) PCT Pub. No.: WO2015/116754
PCT Pub. Date: Aug. 6, 2015

(65) Prior Publication Data
US 2016/0347966 A1 Dec. 1, 2016

(30) Foreign Application Priority Data
Jan. 31, 2014 (EP) .................... 14153497

(51) Int. Cl.
| | |
|---|---|
| *C09D 151/00* | (2006.01) |
| *C08F 259/08* | (2006.01) |
| *C08F 2/26* | (2006.01) |
| *C08F 6/20* | (2006.01) |
| *C08F 6/16* | (2006.01) |
| *C08F 2/30* | (2006.01) |
| *C08F 14/26* | (2006.01) |
| *C08J 3/09* | (2006.01) |
| *C08K 5/06* | (2006.01) |
| *C08F 14/18* | (2006.01) |
| *C08F 214/18* | (2006.01) |
| *C08F 14/28* | (2006.01) |
| *C08F 214/26* | (2006.01) |
| *C08F 214/28* | (2006.01) |

(Continued)

(52) U.S. Cl.
CPC ............ *C09D 151/003* (2013.01); *C08F 2/26* (2013.01); *C08F 2/30* (2013.01); *C08F 6/16* (2013.01); *C08F 6/20* (2013.01); *C08F 14/26* (2013.01); *C08F 259/08* (2013.01); *C08J 3/097* (2013.01); *C08F 14/08* (2013.01); *C08F 14/185* (2013.01); *C08F 14/28* (2013.01); *C08F 114/26* (2013.01); *C08F 214/18* (2013.01); *C08F 214/184* (2013.01); *C08F 214/26* (2013.01); *C08F 214/262* (2013.01); *C08F 214/28* (2013.01); *C08F 2500/11* (2013.01); *C08F 2500/12* (2013.01); *C08F 2500/17* (2013.01); *C08F 2500/19* (2013.01); *C08F 2500/24* (2013.01); *C08F 2500/26* (2013.01); *C08J 2351/06* (2013.01); *C08K 5/06* (2013.01); *C08L 51/003* (2013.01); *C08L 2201/50* (2013.01); *Y10T 428/3154* (2015.04); *Y10T 428/31544* (2015.04)

(58) Field of Classification Search
None
See application file for complete search history.

(56) References Cited

U.S. PATENT DOCUMENTS

| | | | |
|---|---|---|---|
| 3,037,953 A | 6/1962 | Marks | |
| 3,142,665 A * | 7/1964 | Cardinal | C08F 2/38 428/402 |

(Continued)

FOREIGN PATENT DOCUMENTS

| | | |
|---|---|---|
| CN | 102716678 A1 | 10/2012 |
| DE | 2714593 | 10/1978 |

(Continued)

OTHER PUBLICATIONS

Dow, Structure of Tergitol 15-S, Dow Chemical Company, Mar. 12, 2018, pp. 1-2, https://dowac.custhelp.com/app/answers/detail/a_id/1464 (Year: 2018).*

(Continued)

*Primary Examiner* — Vivian Chen
(74) *Attorney, Agent, or Firm* — Thomas M. Spielbauer

(57) ABSTRACT

An aqueous dispersion comprising a tetrafluoroethylene core-shell polymer and at least one surfactant corresponding to the general formula $R_1O-[CH_2CH_2O]_n[R_2O]_m-R_3$ wherein $R_1$ represents a linear or branched aliphatic hydrocarbon group having at least 8 carbon atoms, preferably 8 to 18 carbon atoms, R2 represents an alkylene having 3 carbon atoms, R3 represents hydrogen, a C1-C3 alkyl group, or a C1-C3 hydroxyalkyl group, n has a value of 0 to 40, m has a value of 0 to 40 and the sum of n+m is at least 2, wherein the dispersion is free of fluorinated emulsifiers or contains them in an amount of less than 50 ppm based on the weight of the dispersion and wherein the core-shell polymer contains an outer shell of tetrafluoroethylene homopolymer. Further provided are methods of making the dispersions, coating compositions comprising the dispersions and article coated by the coating composition.

18 Claims, No Drawings

(51) Int. Cl.
*C08F 114/26* (2006.01)
*C08F 14/08* (2006.01)
*C08L 51/00* (2006.01)

(56) References Cited

U.S. PATENT DOCUMENTS

| | | | |
|---|---|---|---|
| 3,489,595 A | 1/1970 | Brown, Jr. | |
| 3,654,210 A * | 4/1972 | Kuhls et al. | C08F 259/08 523/201 |
| 4,369,266 A | 1/1983 | Kuhls | |
| 4,391,940 A * | 7/1983 | Kuhls | H01B 3/445 524/458 |
| 5,576,381 A | 11/1996 | Bladel | |
| 6,566,452 B1 | 5/2003 | Bladel | |
| 6,833,403 B1 | 12/2004 | Bladel | |
| 6,841,594 B2 | 1/2005 | Jones | C08F 259/08 523/201 |
| 6,956,078 B2 * | 10/2005 | Cavanaugh | C08F 259/08 524/378 |
| 7,342,066 B2 * | 3/2008 | Dadalas | C09D 127/18 524/544 |
| 7,347,960 B2 * | 3/2008 | Jones | C08L 27/18 264/127 |
| 7,612,139 B2 * | 11/2009 | Jones | C08F 259/08 523/310 |
| 7,872,073 B2 * | 1/2011 | Jones | D01F 6/12 525/54.3 |
| 2003/0008944 A1 * | 1/2003 | Jones | C09D 151/003 523/201 |
| 2003/0130393 A1 * | 7/2003 | Cavanaugh | C08K 5/06 524/366 |
| 2005/0090601 A1 * | 4/2005 | Dadalas | C09D 127/18 524/544 |
| 2005/0107518 A1 * | 5/2005 | Zipplies | C09D 127/18 524/544 |
| 2005/0143494 A1 * | 6/2005 | Jones | D01F 6/12 523/201 |
| 2006/0264537 A1 * | 11/2006 | Jones | C09D 151/003 523/201 |
| 2007/0015937 A1 | 1/2007 | Hintzer | |
| 2007/0281101 A1 * | 12/2007 | Cavanaugh | C08L 27/18 427/407.1 |
| 2008/0015304 A1 | 1/2008 | Hintzer | |
| 2009/0286932 A1 * | 11/2009 | Sawauchi | C08F 6/16 524/805 |
| 2012/0028046 A1 * | 2/2012 | Ono | C08F 14/26 428/402 |
| 2012/0129982 A1 * | 5/2012 | Zipplies | C08L 27/20 524/58 |
| 2013/0040142 A1 * | 2/2013 | Frey | C08F 2/24 428/402 |
| 2013/0231020 A1 * | 9/2013 | Liao | D06N 3/047 442/59 |
| 2015/0021814 A1 * | 1/2015 | Aten | C08J 7/08 264/234 |
| 2016/0083607 A1 * | 3/2016 | Sisler | C08K 5/06 524/269 |
| 2016/0122572 A1 * | 5/2016 | Zipples | C08K 5/06 524/58 |
| 2016/0130409 A1 * | 5/2016 | Zipplies | C09D 127/18 428/422 |

FOREIGN PATENT DOCUMENTS

| | | |
|---|---|---|
| EP | 0130052 | 1/1985 |
| EP | 0329154 | 8/1989 |
| EP | 0969055 | 1/2000 |
| EP | 1016466 | 7/2002 |
| EP | 1240125 | 9/2002 |
| EP | 1245596 | 10/2002 |
| EP | 1526142 | 4/2005 |
| EP | 1529785 | 5/2005 |
| EP | 1533325 | 5/2005 |
| EP | 1538177 | 6/2005 |
| EP | 2902424 | 8/2015 |
| EP | 2927248 | 10/2015 |
| WO | WO 94/14904 | 7/1994 |
| WO | WO 00/44576 | 8/2000 |
| WO | WO 02/078862 | 10/2002 |
| WO | WO 03/059992 | 7/2003 |
| WO | WO 2005/040239 A2 | 5/2005 |
| WO | WO 2005/052013 A1 | 6/2005 |
| WO | WO 2006/014393 A1 | 2/2006 |
| WO | WO 2006/041581 A2 | 4/2006 |
| WO | WO 2006/069101 | 6/2006 |
| WO | WO 2006/127317 A1 | 11/2006 |
| WO | WO 2007/142888 | 12/2007 |
| WO | WO 2008/073251 | 6/2008 |
| WO | WO 2008/134138 | 11/2008 |
| WO | WO 2010/149262 | 12/2010 |
| WO | WO 2011/014715 | 2/2011 |
| WO | WO-2012092414 A2 * | 7/2012 ............. C08F 14/26 |
| WO | WO 2014/186647 | 11/2014 |

OTHER PUBLICATIONS

CCI, Tergitol 15-S-9 Safety Data Sheet, Columbus Chemical Industries, Mar. 9, 2016, pp. 1-6 (Year: 2016).*
Spectrum Chemical, Tergitol TMN-10, Spectrum Chemical Manufacturing Corp., retrieved Oct. 14, 2019, p. 1 (Year: 2019).*
Merck, "Tivida FL 2300-30 The High Speed Fluorosurfactant", Product Information, Sep. 2012, 6pgs.
Scheirs, Modern Fluoropolymers, 376-378, (1997).
International Search Report for PCT International Application No. PCT/US2015/013411, dated Apr. 28, 2015, 3pgs.

* cited by examiner

TETRAFLUOROETHYLENE POLYMER DISPERSIONS STABILIZED WITH ALIPHATIC NON-IONIC SURFACTANTS

CROSS REFERENCE TO RELATED APPLICATIONS

This application is a national stage filing under 35 U.S.C. 371 of PCT/US2015/013411, filed Jan. 29, 2015, which claims the benefit of European Application No. 14153497.4, filed Jan. 31, 2014, the disclosure of which is incorporated by reference in their entirety herein.

FIELD

The present disclosure relates to tetrafluoroethylene polymer dispersions, coating compositions containing the dispersions and methods of making them and methods of coating and coated articles.

BACKGROUND

Fluoropolymers, and in particular tetrafluoroethylene polymers, and more particular polytetrafluoroethylenes (PTFE's), are known for their high chemical inertness, low friction and non-stick properties, high melting points and high service temperatures. These properties have made fluoropolymers the materials of choice for making protective coatings for demanding applications in architecture, medical appliances, chemical engineering, aircraft and automotive industry, and also in household products.

The most convenient way to apply fluoropolymer coatings, and in particular tetrafluoroethylene polymer coatings, is to use coating compositions containing aqueous dispersions of the fluoropolymers and to apply them on the substrate, for example by spray pumping. Such dispersions are typically produced by aqueous emulsion polymerization using fluorinated emulsifiers. Desirably, the fluorinated emulsifiers are removed from the dispersions and replaced by non-fluorinated emulsifiers. However, the removal of fluorinated emulsifiers and their substitution by non-fluorinated emulsifiers can lead to instability of the dispersions and less favourable coating properties, like poorer film forming.

Therefore, there is a need to provide fluoropolymer dispersions, and in particular tetrafluorethene polymer dispersions, and more particularly PTFE dispersions, that are substantially free of fluorinated emulsifiers but show good coating properties and have good shear stability.

SUMMARY

In one aspect there is provided an aqueous dispersion comprising a tetrafluoroethylene core-shell polymer and at least one surfactant corresponding to the general formula:

$$R_1O-[CH_2CH_2O]_n-[R_2O]_m-R_3 \quad (I)$$

wherein $R_1$ represents a linear or branched aliphatic hydrocarbon group having at least 6 carbon atoms, preferably 8 to 18 carbon atoms, $R_2$ represents an alkylene unit having 3 or 4 carbon atoms, $R_3$ represents hydrogen, a $C_1$-$C_3$ alkyl group, or a $C_1$-$C_3$ hydroxyalkyl group, n has a value of 0 to 40, m has a value of 0 to 40 and the sum of n+m is at least 2, wherein the core-shell polymer contains an outer shell that has a greater molecular weight than the core and wherein the dispersion is essentially free of fluorinated emulsifiers corresponding to the formula $$Y-R_f-Z-M$$

wherein Y represents hydrogen, Cl or F; $R_f$ represents a linear or branched perfluorinated or partially fluorinated alkylene wherein the alkylene chain may be interrupted once or more than once by oxygen atoms; Z represents an acid anion, and M represents a counter cation and wherein essentially free means and amount of less than 50 ppm and including 0 ppm based on the weight of the dispersion.

In another aspect there is provided a method of making a core-shell tetrafluoroethylene polymer dispersion comprising providing a tetrafluoroethylene core-shell polymer obtainable by aqueous emulsion polymerization in the presence of fluorinated emulsifiers and subsequent removal of the fluorinated emulsifiers, wherein non-fluorinated non-ionic emulsifiers according to formula (I) are added to the dispersion prior to, during or after the removal of the fluorinated emulsifiers, and wherein the fluorinated emulsifiers correspond to the formula $$Y-R_f-Z-M$$

wherein Y represents hydrogen, Cl or F; $R_f$ represents a linear or branched perfluorinated or partially fluorinated alkylene wherein the alkylene chain may be interrupted once or more than once by oxygen atoms; Z represents an acid anion or a plurality thereof, and M represents a counter cation or a plurality thereof.

In a further aspect there is provided a coating composition comprising the aqueous dispersion.

In yet another aspect there is provided a method of coating an article comprising applying the coating composition followed by a temperature treatment.

In a further aspect there is provided an article comprising a coating obtained with a coating composition.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items. For example, a composition containing an ingredient A is meant to contain A or A and other ingredients. A composition consisting of A is meant to have ingredient A but no other ingredient. In both cases (limiting or non limiting meaning) equivalents are meant to be included.

The use of "a" or "an" is meant to encompass "one or more".

Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

Fluoropolymers:

The fluoropolymers according to the present disclosure are tetrafluoroethylene polymers, i.e., fluoropolymers comprising repeating units derived from tetrafluoroethylene (TFE). The tetrafluoroethylene polymers may be homopolymers of TFE or copolymers of TFE and at least one other comonomer. Preferably, the comonomers are perfluorinated. Suitable perfluorinated comonomers include perfluorinated alpha-olefins, in particular hexafluoropropene (HFP), and perfluorinated alkyl vinyl ethers or perfluorinated alkyl allyl ethers wherein the perfluorinated alkyl residues may be interrupted once or more than once by an oxygen atom. Examples of suitable allyl and vinyl ethers include those corresponding to the general formulae $$CF_2=CF-(CF_2)_n-O-Rf \quad (II),$$

and $$CF_2=CF-(CF_2)_n-O-Rf-O-(CF_2)_m-CF=CF_2 \quad (III).$$

In formula (II) n represents either 0 or 1. Rf represents a linear or branched, cyclic or acyclic perfluorinated alkyl residue containing at least one catenary oxygen atom. Rf may contain up to 8, preferably, or up to 6 carbon atoms, such as 1, 2, 3, 4, 5 and 6 carbon atoms. Typical examples of Rf include linear or branched perfluorinated alkyl residues interrupted by once or more than once by an oxygen atom, for example, linear or branched perfluorinated alkyl residues containing 2, 3, 4 or 5 catenary ether oxygens. Further specific examples of Rf include residues containing one or more of the following units and combinations thereof: —(CF$_2$O)—, —(CF$_2$CF$_2$—O)—, (—O—CF$_2$)—, —(O—CF$_2$CF$_2$)—, —CF(CF$_3$)—, —CF(CF$_2$CF$_3$)—, —O—CF(CF$_3$)—, —O—CF(CF$_2$CF$_3$)—, —CF(CF$_3$)—O—, —CF(CF$_2$CF$_3$)—O—. Further examples of Rf include but are not limited to:
—(CF$_2$)$_{r1}$—O—C$_3$F$_7$,
—(CF$_2$)$_{r2}$—O—C$_2$F$_5$,
—(CF$_2$)$_{r3}$—O—CF$_3$,
—(CF$_2$—O)$_{s1}$—C$_3$F$_7$,
—(CF$_2$—O)$_{s2}$—C$_2$F$_5$,
—(CF$_2$—O)$_{s3}$—CF$_3$,
—(CF$_2$CF$_2$—O)$_{t1}$—C$_3$F$_7$,
—(CF$_2$CF$_2$—O)$_{t2}$—C$_2$F$_5$,
—(CF$_2$CF$_2$—O)$_{t3}$—CF$_3$,
wherein r1 and s1 represent 1, 2, 3, 4, or 5, r2 and s2 represent 1, 2, 3, 4, 5 or 6, r3 and s3 represent 1, 2, 3, 4, 5, 6 or 7; t1 represents 1 or 2; t2 and t3 represent 1, 2 or 3.

Specific examples of suitable perfluorinated comonomers include
F$_2$C=CF—O—CF$_2$—O—(CF$_2$)—F,
F$_2$C=CF—O—CF$_2$—O—(CF$_2$)$_2$—F,
F$_2$C=CF—O—CF$_2$—O—(CF$_2$)$_3$—F,
F$_2$C=CF—O—CF$_2$—O—(CF$_2$)$_4$—F,
F$_2$C=CF—O—(CF$_2$)$_2$—OCF$_3$,
F$_2$C=CF—O—(CF$_2$)$_3$—OCF$_3$,
F$_2$C=CF—O—(CF$_2$)$_4$—OCF$_3$,
F$_2$C=CF—CF$_2$—O—(CF$_2$)$_3$—(OCF$_2$)$_2$—F,
F$_2$C=CF—CF$_2$—O—CF$_2$OCF$_2$)$_3$—CF$_3$,
F$_2$C=CF—CF$_2$—O—CF$_2$OCF$_2$)$_4$—CF$_3$,
F$_2$C=CF—CF$_2$—O—(CF$_2$O)$_2$—OCF$_3$,
F$_2$C=CF—CF$_2$—O—(CF$_2$O)$_3$—OCF$_3$,
F$_2$C=CF—CF$_2$—O—(CF$_2$O)$_4$—OCF$_3$.

In formula (III) n and m represent, independently from each other, either 1 or 0. Rf represents a linear, branched, cyclic or acyclic perfluorinated alkylene unit that may or may not contain one or more catenary ether oxygen atoms. Rf' may have up to 8, preferably up to 6 carbon atoms. Typical examples of Rf' include linear or branched alkylenes containing one or more —(CF$_2$O)— or —(CF$_2$CF$_2$—O)— units. Further examples for Rf' include but are not limited to
—(CF$_2$)$_u$,
—(CF$_2$)$_o$—CF(CF$_3$)—(CF$_2$)$_q$—
—(CF$_2$)$_o$—CF(C$_2$F$_5$)—(CF$_2$)$_q$—
wherein u represents 1, 2, 3, 4, 5, 6, 7 or 8; o represents 0, 1, 2, 3, 4, 5, 6, q represents 0, 1, 2, 3, 4, 5, 6 with the proviso that o+q is 6 or less.

Specific examples of suitable perfluorinated comonomers further include
F$_2$C=CF—O—X—O—CF=CF$_2$,
F$_2$C=CF—O—X—O—CF$_2$—CF=CF$_2$,
F$_2$C=CF—CF$_2$—O—X—O—CF$_2$—CF=CF$_2$, wherein X is (CF$_2$)n and n is 1, 2, 3, 4, 5, 6, 7 or 8.

Perfluorinated comonomers as described above are either commercially available, for example from Anles Ltd. St. Petersburg, Russia or can be prepared according to methods described in EP 1 240 125 to Worm et al., or EP 0 130 052 to Uschold et al. or in Modern Fluoropolymers, J. Scheirs, Wiley 1997, p 376-378.

In a particular embodiment the tetrafluoroethylene fluoropolymers are polytetrafluoroethylenes (PTFE). PTFE's include (TFE) homopolymers (also referred to as "unmodified PTFE") and TFE copolymers with up to 1% by weight (based on the total weight of the polymers) of one or more perfluorinated comonomers (also referred to as "modified PTFE"). The perfluorinated comonomers include the comonomers described above. A particular suitable example is HFP. The PTFE's typically have a melting point within the range of 327+/−10° C. The PTFE's typically have a high molecular weight, typically about 10$^6$ g/mole or greater. PTFE's typically also have a very high melt viscosity (about 10$^{10}$-10$^{13}$ Pa·s at 380° C.). This results in PTFE having a melt flow index (MFI) of less than 1 g/10 min or even less than 0.1 g/10 min at 372° C. using a 5 kg load (MFI 372/5) or having a MFI 372/5 of 0 g/10 min. The MFI measures the amount of polymer that can be pushed through a die at a specified temperature (here 372° C.) using a specified weight (here 5 kg).

The tetrafluoroethylene homo- and copolymers provided herein, in particular PTFE's, have a melting point of at least 317° C. or at least 319° C. or at least 321° C.

The tetrafluoroethylene copolymers provided herein, may have an MFI (372/5) of less than 15 g/10 min. PTFE's may have an MFI (372/5) of less than 1 g/10 min and more preferably less than 0.6 g/10 min and most preferably not measurable, e.g. 0 g/10 min.

The tetrafluoroethylene polymers provided herein are core-shell polymers. They may contain an outer shell of tetrafluoroethylene polymer, preferably PTFE, most preferably unmodified PTFE.

In particular embodiments, the tetrafluoroethylene polymers, preferably PTFE's, have an outer shell having a higher molecular weight than the core, or if present, an inner shell. In a preferred embodiment the outer shell is unmodified PTFE. The core may also be unmodified PTFE or, preferably, modified PTFE.

Preparation of Tetrafluoroethylene Polymers:

The fluoropolymers may be prepared by a radical polymerization as known in the art. The preferred polymerization method is aqueous emulsion polymerization. In aqueous emulsion polymerizations the polymerization is carried out in the presence of fluorinated emulsifiers. When using the term "fluorinated emulsifiers" it is meant to refer to emulsifiers of the same chemical composition, for example the fluorinated emulsifiers used may be all perfluorooctanoic acid, and also to mixtures of surfactants having different chemical compositions. The dispersions may remain stable for at least 2 hours, or at least 12 hours or at least 24 hours after stirring of the reaction mixture has stopped. Typically, fluorinated emulsifiers are employed in the aqueous emulsion polymerisation. The fluorinated emulsifiers are typically used in an amount of 0.01% by weight to 1% by weight based on solids (polymer content) to be obtained.

Suitable fluorinated emulsifiers include any fluorinated emulsifier commonly employed in aqueous emulsion polymerization of fluoropolymers. Such fluorinated emulsifiers are non-telogenic, i.e. they are inert during the reaction conditions. They do not act as chain transfer agents. Particularly preferred emulsifiers are those that correspond to the general formula:

$$Y-R_f-Z-M \qquad (IV)$$

wherein Y represents hydrogen, Cl or F; $R_f$ represents a linear or branched perfluorinated or partially fluorinated alkylene. The alkylene chain may be interrupted once or more than once by an oxygen atom. Typically, $R_f$ contains 4 to 10 carbon atoms. Z represents an acid anion, for example $COO^-$, $SO_2^-$ or $SO_3^-$, or a plurality thereof, and M represents a counter cation, or a plurality thereof, for example an alkali metal ion, an ammonium ion or $H^+$. Exemplary emulsifiers include: ammonium salts of perfluorinated alkanoic acids, such as perfluorooctanoic acid and perfluorooctane sulphonic acid.

A more specific subsection of fluorinated emulsifiers according to formula (IV) includes those of the general formula:

$$[R_f-O-L-COO^-]X^+ \qquad (V)$$

wherein L represents a linear or branched partially or fully fluorinated alkylene group or an aliphatic hydrocarbon group, $R_f$ represents a linear or branched, partially or fully fluorinated aliphatic group or a linear or branched partially or fully fluorinated group that may be interrupted once or more than once by an oxygen atom. $X^+$ represents a cation. In case the emulsifier contains a partially fluorinated aliphatic group it is referred to as a partially fluorinated emulsifier.

Preferably, the molecular weight of the anionic part of the fluorinated emulsifier is less than 1,000 g/mole, most preferably the molecular weight of the emulsifier is less than 1,000 g/mole. Preferably, L is linear.

Specific examples of fluorinated emulsifiers include those as described in, for example, US Pat. Publ. 2007/0015937 (Hintzer et al.). Exemplary emulsifiers include but are not limited to: $CF_3CF_2OCF_2CF_2OCF_2COOH$, $CHF_2(CF_2)_5COOH$, $CF_3(CF_2)_6COOH$, $CF_3O(CF_2)_3OCF(CF_3)COOH$, $CF_3CF_2CH_2OCF_2CH_2OCF_2COOH$, $CF_3O(CF_2)_3OCHFCF_2COOH$, $CF_3O(CF_2)_3OCF_2COOH$, $CF_3(CF_2)_3(CH_2CF_2)_2CF_2CF_2CF_2COOH$, $CF_3(CF_2)_2CH_2(CF_2)_2COOH$, $CF_3(CF_2)_2COOH$, $CF_3(CF_2)_2(OCF(CF_3)CF_2)OCF(CF_3)COOH$, $CF_3(CF_2)_2(OCF(CF_3)CF_2)_4OCF(CF_3)COOH$, $CF_3CF_2O(CF_2CF_2O)_3CF_2COOH$, and their salts.

Other emulsifiers include fluorosurfactants that are not carboxylic acids, such as, for example, sulfinates or perfluoroaliphatic sulfinates or sulfonates. The sulfinate may have a formula $Rf-SO_2M$, where Rf is a perfluoroalkyl group or a perfluoroalkoxy group. The sulfinate may also have the formula $Rf-(SO_2M)n$ where $R_f$ is a polyvalent, preferably divalent, perfluoro radical and n is an integer from 2-4, preferably 2. Preferably the perfluoro radical is a perfluoroalkylene radical. Generally Rf and Rf' have 1 to 20 carbon atoms, preferably 4 to 10 carbon atoms. M is a cation having a valence of 1 (e.g. H+, Na+, K+, $NH_4+$, etc.). Specific examples of such fluorosurfactants include, but are not limited to $C_4F_9-SO_2Na$; $C_6F_{13}-SO_2Na$; $C_8F_{17}-SO_2Na$; $C_6F_{12}-(SO_2Na)_2$; and $C_3F_7-O-CF_2CF_2-SO_2Na$.

The fluorinated emulsifiers may be used in the polymerization alone or in combination as a mixture of two or more fluorinated emulsifiers.

In one embodiment, the fluorinated emulsifier is added as a microemulsion with a fluorinated liquid, such as described in U.S. Publ. No. 2008/0015304 (Hintzer et al.), WO Publ. No. 2008/073251 (Hintzer et al.), and EP Pat. No. 1245596 (Kaulbach et al.). Microemulsions are emulsions that are thermodynamically stable (stable for longer than 24 hours) and have droplet sizes from 10 nm to a maximum of 100 nm. They are transparent to the naked eye. Typically, rather large quantities of fluorinated emulsifiers are used to prepare the microemulsions. In cases where a mixture is used that is not a microemulsion, the particle sizes and amounts of the ingredients are such that the emulsion or mixture formed is not transparent, but is milky or opaque to the naked eye. Typical fluorinated liquids include fluorinated or perfluorinated hydrocarbons or fluorinated or perfluorinated ethers or polyethers. The fluorinated liquids may be added in excess of the emulsifier. In one embodiment, the weight ratio of the fluorinated liquid to emulsifier is greater than 1:1, 1.5:1, 2:1, 2.5:1, 3:1, 5:1, or even 10:1.

In a more preferred embodiment the fluorinated emulsifiers are not added in the form of a microemulsion as described above. It is added as aqueous solution.

The aqueous emulsion polymerization is initiated by a reaction initiator or a reaction initiator system. Any of the known or suitable initiators for initiating an aqueous emulsion polymerization of fluoropolymers or PTFE can be used. Suitable initiators include organic as well as inorganic initiators, although the latter are generally preferred. Exemplary organic initiators include: organic peroxides such as bissuccinic acid peroxide, bisglutaric acid peroxide, or tert-butyl hydroperoxide. Exemplary inorganic initiators include: ammonium-alkali- or earth alkali salts of persulfates, permanganic or manganic acids, with potassium permanganate preferred. A persulfate initiator, e.g. ammonium persulfate (APS), may be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate or fluoroalkyl sulfinates. The reducing agent typically reduces the half-life time of the persulfate initiator. Additionally, a metal salt catalyst such as for example copper, iron, or silver salts may be added.

The amount of the polymerization initiator may be selected as suited and as known in the art. Usually the initiator is used from 2 to 600 ppm, based on the mass of water used in the polymerisation as aqueous phase.

The aqueous emulsion polymerization system may further comprise auxiliaries, such as buffers, and complex-formers. It is preferred to keep the amount of auxiliaries as low as possible to ensure a higher colloidal stability of the polymer latex.

In a preferred embodiment, a seeded polymerization is used to produce the tetrafluoroethylene polymers. If the composition of the seed particles is different from the polymers that are formed on the seed particles a core-shell polymer is formed. That is, the polymerization is initiated in the presence of small particles of fluoropolymer, typically tetrafluoroethylene polymers that have been homopolymerized or copolymerized with one or more of the perfluorinated comonomers as described above. These seed particles typically may have a Z-average diameter of between 50 and 100 nm or 50 and 150 nm (nanometers). Such seed particles may be produced, for example, in a separate aqueous emulsion polymerization and in a way as described above. The seed composition may be used in an amount of 2 to 50% by weight based on the weight of the water in the aqueous emulsion polymerization. The polymerization is then run as described above to produce the final polymer. Accordingly, the thus produced polymer particles will comprise a core/shell structure. Polymer particles may be produced that have one or more intermediate shells if the polymer compositions are varied accordingly. Polymerization of tetrafluoroethylene (TFE) using seed particles is described, for example, in U.S. Pat. No. 4,391,940 (Kuhls et al.) or WO03/059992 A1. When PTFE polymers are to be produced, the total amount of comonomers either in the core or in the shell or in a combination thereof, does not exceed 1% by weight based on the total composition of the polymer.

The core-shell polymers provided herein contain an outer shell that has a higher molecular weight than the core and/or an intermediate layer, if present. For example, the outer shell of the polymer may be obtained without using a chain transfer agent.

In one embodiment the tetrafluoroethylene polymers contain an outer shell of unmodified PTFE, i.e. a shell of a PTFE homopolymer. The core may be of modified or unmodified PTFE. In a particular embodiment the core is of modified PTFE, i.e. a comonomer of TFE and at least one perfluorinated comonomer. A preferred comonomer is HFP.

In one embodiment the tetrafluoroethylene polymers contain an outer shell that has a higher molecular weight than the core. The outer shell may be of unmodified PTFE and the core may be of modified PTFE. The outer shell may also be of modified PTFE and the core may be of unmodified PTFE or of modified PTFE of the same or different monomer composition than the shell. Core and shell may also have the same monomer composition but different amounts of comonomers. A preferred comonomer is HFP.

In a preferred embodiment the core of the core-shell polymers provided herein is of modified PTFE, i.e. a comonomer of TFE and at least one perfluorinated comonomer as described above. A preferred comonomer is HFP.

An advantage of tetrafluoroethylene polymers of the core-shell type is that it allows the formation of polymers with a more controlled and narrow particle size distribution. It also allows for the controlled preparation of polymer particles having a particle size of greater than 170 nm or at least 200 nm (Z-average). Larger particle sizes are generally desirable for preparing thick coatings.

The aqueous emulsion polymerization, whether done with or without seed particles, will preferably be conducted at a temperature of at least 10° C., 25° C., 50° C., 75° C., or even 100° C.; at most 70° C., 80° C., 90° C., 100° C., 110° C., 120° C., or even 150° C. The polymerization may be conducted as known in the art, for example, at a pressure of from about 0.5 to about 4.5 MPa.

Usually the aqueous emulsion polymerization is carried out by mildly stirring the aqueous polymerization mixture. The stirring conditions are controlled to avoid coagulation of the polymer particles formed. Vessels and agitators and other processing equipment can be used as known in the art.

The aqueous emulsion polymerization usually is carried out until the concentration of the polymer particles in the aqueous emulsion is between 15 and 50% by weight (also referred to a solid content).

In the resulting dispersion, the average particle size of the polymer particles typically is greater than 150 nm, for example between about 160 and about 350 nm, or between about 200 and up to about 300 nm or between about 170 and up to about 275 nm (Z-average). The particle sizes of dispersions can be determined by inelastic light scattering.

After completion of the polymerization reaction, the dispersions are treated to remove the fluorinated emulsifiers. Methods of removing the emulsifiers from the dispersions by anion-exchange and addition of non-ionic emulsifiers are disclosed as for example in EP 1 155 055 B1, which is the preferred method. Other methods include the addition of polyelectrolytes as disclosed in WO2007/142888 or by addition of non-ionic polymeric stabilizers such as polyvinylalcohols, polyvinylesters and the like, or subjecting the dispersion to ultrafiltration. Removal of fluorinated emulsifiers by anion exchange is preferred.

The fluoropolymer content in the dispersions may be increased by upconcentration, for example using ultrafiltration as described, for example in U.S. Pat. No. 4,369,266 or by thermal decantation (as described for example in U.S. Pat. No. 3,037,953) or by electrodecantation. The solid content of upconcentrated dispersions is typically about 50 to about 70% by weight.

Dispersions subjected to a treatment of removing the fluorinated emulsifiers contain no fluorinated emulsifiers or only a reduced amount thereof, such as for example amounts of from about 1 to about 50 ppm (or 2 to 20 ppm) based on the total weight of the dispersion. Reducing the amount of fluorinated emulsifiers can be carried out for individual dispersions or for combined dispersions, e.g. bimodal or multimodal dispersions as described above or below. Preferably, the dispersions provided herein are ion-exchanged dispersions, which means they have been subjected to an anion-exchange process to remove fluorinated emulsifiers, preferably in the presence of non-fluorinated, non-ionic emulsifiers, more preferably in the presence of the non-fluorinated non-ionic emulsifiers according to formula (I).

The dispersions provided herein may have a conductivity of at least 200 µS, for example between 300 µS and 5,000 µS or between 500 and 1,500 µS. The desired level of conductivity of the dispersion may be adjusted by adding a salt thereto such as for example a simple inorganic salt such as sodium chloride or ammonium chloride, sulfates, sulfonates, phosphates and the like. Also, the level of conductivity may be adjusted by adding an anionic surfactant to the dispersion as disclosed in WO 03/020836. Typical anionic surfactants that may be used include surfactants that have an acid group, in particular a sulfonic or carboxylic acid group. Examples of anionic surfactants include surfactants that have one or more anionic groups. Such anionic surfactants are typically non-fluorinated surfactants. They may include in addition to one or more anionic groups, other hydrophilic groups such as polyoxyalkylene groups having 2 to 4 carbons in the oxyalkylene group (for example, polyoxy ethylene groups). Typical non-fluorinated surfactants include anionic hydrocarbon surfactants. The term "anionic hydrocarbon surfactants" as used herein comprises surfactants that include one or more hydrocarbon moieties in the molecule and one or more anionic groups, in particular acid groups such as sulfonic, sulfuric, phosphoric and carboxylic acid groups and salts thereof. Examples of hydrocarbon moieties of the anionic hydrocarbon surfactants include saturated and unsaturated aliphatic groups having for example 6 to 40 carbon atoms, preferably 8 to 20 carbon atoms. Such aliphatic groups may be linear or branched and may contain cyclic structures. The hydrocarbon moiety may also be aromatic or contain aromatic groups. Additionally, the hydrocarbon moiety may contain one or more hetero-atoms such as for example oxygen, nitrogen and sulfur.

Particular examples of non fluorinated, anionic hydrocarbon surfactants include alkyl sulfonates such as lauryl sulfonate, alkyl sulfates such as lauryl sulfate, alkylarylsulfonates and alkylarylsulfates, and alkylsulfosuccinates, fatty (carboxylic) acids and salts thereof such as lauric acids and salts thereof and phosphoric acid alkyl or alkylaryl esters and salts thereof. Commercially available anionic hydrocarbon surfactants that can be used include those available under the trade designation Polystep A1 6 (sodium dodecylbenzyl sulphonate) from Stepan Company, Germany; Hostapur SAS 30 (secondary alkyl sulphonate sodium salt), Emulsogen LS (sodium lauryl sulfate) and Emulsogen EPA 1954 (mixture of C2 to C4 sodium alkyl sulfates) each available from Clariant GmbH, Germany; Edenor C-12 (Lauric acid) available from Cognis, Germany; and TRITON X-200 (sodium alkylsulfonate) available from Dow Chemical, Midland, Mich. Further suitable anionic surfactants include the sulfosuccinates disclosed in EP 1538177 and EP 1526142.

Adding cationic emulsifiers to the dispersions is also possible, as described for example in WO 2006/069101.

Non-Fluorinated, Non-Ionic Surfactants:

The tetrafluoroethylene polymer dispersions provided herein contain at least one non-fluorinated non-ionic surfactant corresponding to the general formula (I):

$$R_1O\text{---}[CH_2CH_2O]_n\text{---}[R_2O]_m\text{---}R_3 \qquad (I)$$

wherein $R_1$ represents a linear or branched aliphatic or aromatic hydrocarbon group. Preferably $R_1$ has at least 6 carbon atoms, preferably 8 to 18 carbon atoms. In a preferred embodiment, the residue $R_1$ is a residue $(R')(R'')HC$— wherein R' and R'' are the same or different, linear, branched or cyclic alkyl groups, wherein the total amount of carbon atoms is at least 5 and preferably from 7 to 17. In formula (I) $R_2$ represents an alkylene unit having 3 or 4 carbon atoms. $R_3$ represents hydrogen, a $C_1$-$C_3$ alkyl or hydroxyl alkyl group, n has a value of 0 to 40, m has a value of 0 to 40 and the sum of n+m is at least 2. $R_3$ is chosen such that a terminal hydroxyl group is present. For example $R_3$ can be H or a hydroxyalkyl residue such as hydroxy alyklene groups, for example hydroxy methlyene (—$CH_2$)OH).

In a typical embodiment $R_1$ is a linear branched alkyl group having from 8 to 18 carbon atoms; $R_2$ represents an alkyl group having 3 carbon atoms and $R_3$ is a hydrogen and n is as above.

In another typical embodiment $R_1$ is $(R')(R'')HC$— wherein R' and R'' are the same or different, linear, branched or cyclic alkyl groups, wherein the total amount of carbon atoms of $R_1$ is at least 9 and preferably from 10 to 14. Index m is 0 and index n is from 6 to 12 and $R_3$ is H.

The term "at least one non-fluorinated, non-ionic surfactant" is used herein to refer to surfactants of the same chemical formula but not to a single molecule. The term "at least one non-fluorinated, non-ionic surfactant" is used to indicate that also other non-fluorinated, non-ionic surfactants of different chemical composition may be present, e. g. the non-fluorinated non ionic surfactants may be present as a mixture of several non-fluorinated non-ionic surfactants of different chemical composition. The "at least one non-fluorinated non-ionic surfactant" is used in the effective amount to achieve the desired effect, for example an effective amount to increase the shear stability and/or to improve the film forming properties, like critical film thickness. When the above general formula represents a mixture, n and m will represent the average amount of the respective groups. Also, when the above formula represents a mixture, the indicated amount of carbon atoms in the aliphatic group $R_1$ may be an average number representing the average length of the hydrocarbon group in the surfactant mixture.

Typical amounts of the non-fluorinated non-ionic emulsifiers as described above include 1 to 12% by weight based on the weight of the dispersion.

Non-ionic, non-fluorinated emulsifiers as described above can be prepared, for example, by ethoxylation/propoxylation of secondary alcohols. Non-ionic emulsifiers of the type as described above are also commercially available, for example under the trade designation TERGITOL TMN from Dow Chemical Company, for example TERGITOL TMN 6, TERGITOL TMN 10 and TERGITOL TMN 100X.

The non-fluorinated non-ionic emulsifiers as described above may be added as stabilizing emulsifiers when the fluorinated emulsifiers are removed, or as stabilizing emulsifiers during an upconcentration step or both. However, it is also possible to add the non-fluorinated, non-ionic emulsifiers as described above to the final dispersion and use other non-fluorinated, non-ionic emulsifiers during the upconcentration or removal of fluorinated emulsifiers. However, preferably the dispersion provided herein are free of any aromatic emulsifiers.

Further non-fluorinated, non-ionic surfactants that can be used in addition to the non-fluorinated, non-ionic emulsifiers described above include alkoxylated acetylenic diols. Still further non-ionic surfactants that may be used in addition to the non-fluorinated non-ioic emulsifiers described above include polysiloxane based surfactants such as those available under the trade designation Silwet L77 (Crompton Corp., Middlebury, Conn.). Amine oxides and amine oxide ethoxylates (for example the pH-dependent surfactants disclosed in WO2008/134138 to Dadalas et al) are also considered useful as stabilizing additives to the fluoropolymer dispersions described herein. Other examples of non-ionic surfactants that may be used in addition with the non-ionic emulsifiers described above include sugar surfactants, such as glycoside surfactants, for example alkyl polyglycosides. Another class of non-ionic surfactants includes polysorbates.

The dispersions provided herein show acceptable shear stability. Typically, dispersions can be obtained that have a shear stability of at least 6 minutes.

It has been found that the shear stability can be increased further by adding anionic emulsifiers, preferably sulphate or sulfonate emulsifiers. Low amounts, for example amounts of from about 0.05%, or from about 0.2% by weight, may be sufficient to noticeably increase the shear stability.

In a particular embodiment of the present disclosure the dispersions contain at least one anionic surfactant, in particular a sulfonate surfactant. The term "at least one anionic surfactant" is used herein to refer to surfactants of the same chemical formula but not to a single molecule. The term "at least one anionic surfactant" is used to indicate that also other anionic surfactants of different chemical composition may be present. The "at least one surfactant" is used in the effective amount to achieve the desired effect, for example an effective amount to increase the shear stability. Preferred sulfonate surfactants include sulfosuccinates and acetosulfosuccinates. Preferred examples of sulfosuccinates include those corresponding to the general formula R1OOCCH$_2$—

CH(SO$_3$M)-COOCR5 wherein R1 and R 2 are, independent from each other alkyl residues containing from 4 to 20 carbon atoms, and M represents a cation including H$^+$. Examples of sulfosuccinates are described, for instance, in European patent application EP1538177A1. Examples of acetosulfosuccinates include those corresponding to the general formula:

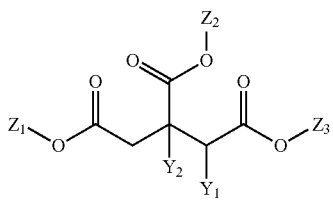

wherein Y$_1$ represent H or —SO$_3$M, Y$_2$ represents H or —SO$_3$M wherein Y$_1$ and Y$_2$ are not both H and preferably Y$_1$ is H, Z$_1$, Z$_2$ and Z$_3$ represent alkyl residues, typically having from about 2 to 12 carbon atoms. Examples of acetosulfosuccinates are described, for example, in WO2010/149262.

In another embodiment, although not preferred, the sulfosuccinates and the aceto sulfo succinates are described as above with the only difference that some or all the alkyl residues are partially or perfluorinated alkyl residues, i.e. the alkyl residues are fluoroalkyl residues. In particular embodiments the fluoroalkyl residues do not contain more than two or more than three carbon atoms because such short fluoroalkyl chains are considered biodegradable. It has been found that the addition of fluorinated (aceto) sulfo succinates to aqueous PTFE dispersion that are free of fluorinated emulsifiers as described above may significantly increase the shear stability when added to non-ionic stabilizing surfactants, like the ones according to the present disclosure, or to other non-ionic stabilizing surfactant, like, alkylpolyglycosides. The effect on increasing shear stability may in fact not be limited to PTFE core-shell particles according to the present disclosure but to any king of PTFE particles. However, adding these fluorinated (aceto) sulfo succinates would introduce fluorinated low molecular weight particles to the dispersions after another type of fluorinated emulsifiers had been removed from the dispersion in a separate purification step. Therefore, the addition of fluorinated (aceto sulfo) succinates represents a non-preferred embodiment of the present disclosure.

A particular advantage of the dispersions provided herein is their favourable film forming properties. Coatings can be obtained having a critical film thickness of greater than 10 μm or even 15 μm or at least 17 μm. Another advantage of the polymer dispersions provided herein is their favourable rewetting properties. Therefore, the tetrafluoroethylene polymer dispersions provided herein have favourable coating properties and are very suitable for the preparation of coating compositions. Coating compositions contain the dispersions provided herein and at least one further coating ingredient. Coating agents are ingredients that may be beneficial when coating or impregnating the dispersion on a substrate, such as adhesion promoters, friction reducing agents, pigments, wetting agents, and the like. Optional components include, for example, buffering agents and oxidizing agents as may be required or desired for the various applications. The dispersions of the present invention can be used to produce final coating compositions for coating various substrates such as metals, fluoropolymer layers and fabrics, such as, for example, glass fiber-based fabrics. Such fabrics may be used as architectural fabrics. Generally, the fluoropolymer dispersions will be blended with further components typically used to produce a final coating composition. Such further components may be dissolved or dispersed in an organic solvent (polar or unpolar) such as toluene, xylene, glycerol, ethylene glycol and the like. Typical coating agents that may be used in a coating composition include polymers others than the tetrafluoroethylene polymers provided herein, including but not limited to polyamide imides, polyimides or polyarylene sulphides or melt processable fluoropolymers (e.g. fluoropolymers having an MFI (372/5) of greater than 1 g/10 min, or greater than 5 g/10 min, for example at least 5 g/10 min. Other coating agents include inorganic carbides, such as silicium carbide. Other coating agents include metal oxides and polyelectrolytes, such as polyanionic compounds (for example polyanionic poly acrylates). Still further ingredients include pigments. Mica particles may be added as well to obtain the final coating composition. The fluoropolymer dispersions provided herein typically represent about 10 to 80% by weight of the final coating composition. Details on coating compositions for metal coatings and components used therein have been described in e.g. WO 02/78862, WO 94/14904, EP 1 016 466 A1, DE 2 714 593 A1, EP 0 329 154 A1, WO 0044576, and U.S. Pat. No. 3,489,595, incorporated herein by reference.

The coating agents may also include other fluoropolymers. For example, the tetrafluoroethylene polymer dispersions provided herein can be used to prepare coating compositions with bimodal, and multimodal particle size distributions for example by mixing different dispersions. These dispersions may have a wide particle size distribution, for example, particle sizes ranging from 20 nm to 1000 nm as disclosed in e.g. U.S. Pat. No. 5,576,381, EP 0 990 009 B1 and EP 969 055 A1. Multi-modal fluoropolymer particle dispersions may present advantageous properties in coatings, such as better adhesion to the substrate and denser film formation. For example, the fluoropolymer dispersions may comprise a mixture of first fluoropolymer particles having an average particle size (Z-average) of at least 180 nm in combination with second fluoropolymer particles that have an average particle size (Z-average particle diameter) of less than 180 nm, preferably an average particle size of not more than 0.9 or not more than 0.7 times the average particle size (Z-average) of the first fluoropolymer particles (as disclosed, for example, in U.S. Pat. No. 5,576,381). Bimodal or multi-modal fluoropolymer dispersions can be conveniently obtained by blending the aqueous fluoropolymer dispersions of different fluoropolymer particle sizes together in the desired amounts. The fluoropolymer population may not only be bimodal or multimodal with respect to the particle sizes but may also be bimodal or multimodal with respect to the fluoropolymers or the molecular weight of the fluoropolymers used. For example the first polymer having an average particle size of at least 180 nm may be a non-meltprocessable fluoropolymer and the second fluoropolymer having an average particles size that is not more than 0.9 or not more than 0.7 times the average particle size of the first polymer may be a non-melt processable or a melt-processable fluoropolymer. Similarly the first and/or second fluoropolymer may be a fluoroelastomer. In particular, dispersions of non-melt processable fluoropolymers may be mixed with aqueous dispersions of other fluoropolymers, in particular melt-processible fluoropolymers. Suitable dispersion of melt-processible fluoropolymers that can be mixed with the non-melt processable fluoropolymer dispersions include dispersions of the following fluoropolymers: copolymers of TFE and a perfluorinated vinyl ether (PFA) and copolymers of TFE and HFP (FEP). Such dispersions may be monomodal, bi-modal or multimodal as disclosed in, e.g., EP 990 009 A1.

The fluoropolymer dispersions provided herein may be used, for example in a coating composition, to laminate, coat and/or impregnate a substrate. The substrate or the treated surface thereof may be an inorganic or organic material. The substrate may be, for example a fiber, a fabric, a granule or a layer. Typical substrates include organic or inorganic fibers, preferably glass fibers, organic or inorganic fabrics, granules (such as polymer beads) and layers containing one or more organic polymers, including, for example, fluoropolymers. The fabrics may be woven or non-woven fabrics. The substrate may also be a metal or an article containing a metal surface or a fluoropolymer surface or layer, such as but not limited to PTFE surfaces or layers.

Advantages and embodiments of this invention are further illustrated by the following list of embodiments and examples, but the particular materials and amounts thereof recited in these examples, as well as other conditions and details, should not be construed to unduly limit this invention. All parts and percentages are by weight unless otherwise indicated.

LIST OF SPECIFIC EMBODIMENTS

1. An aqueous dispersion comprising a tetrafluoroethylene core-shell polymer and at least one non-fluorinated non-ionic surfactants corresponding to the general formula:

$$R_1O-[CH_2CH_2O]_n-[R_2O]_m-R_3 \quad (I)$$

wherein $R_1$ represents a linear or branched aliphatic hydrocarbon group having at least 6 carbon atoms, preferably 8 to 18 carbon atoms, $R_2$ represents an alkylene unit having 3 or 4 carbon atoms, $R_3$ represents hydrogen, a $C_1$-$C_3$ alkyl group, or a $C_1$-$C_3$ hydroxyalkyl group, n has a value of 0 to 40, m has a value of 0 to 40 and the sum of n+m is at least 2,
wherein the core-shell polymer contains an outer shell that has a greater molecular weight than the core and wherein the dispersion is essentially free of fluorinated emulsifiers corresponding to the formula $$Y-R_f-Z-M$$

wherein Y represents hydrogen, Cl or F; $R_f$ represents a linear or branched perfluorinated or partially fluorinated alkylene wherein the alkylene chain may be interrupted once or more than once by oxygen atoms; Z represents an acid anion or a plurality thereof, and M represents a counter cation or a plurality and wherein essentially free means an amount of less than 50 ppm and including 0 ppm based on the weight of the dispersion.
2. The aqueous dispersion of 1. wherein the outer shell is made of tetrafluoroethylene homopolymer.
3. The aqueous dispersion of either one of 1. or 2. wherein $R_1$ in formula (I) is (R')(R")HC— and wherein R' and R" are the same or different, linear, branched or cyclic alkyl groups that may be interrupted once or more than once by an oxygen atom.
4. The aqueous dispersion of any one of the preceding embodiments wherein the tetrafluoroeethene core-shell polymer has an MFI (372/5) of less than 1 g/10 min.
5. The aqueous dispersion of any one of the preceding embodiments wherein the core-shell polymer has a core containing a tetrafluoroethylene copolymer of at least one comonomer, preferably at least one perfluorinated comonomer.
6. The aqueous dispersion of any one of the preceding embodiments wherein the core-shell polymer has a total comonomer content of less than 1 weight percent based on the weight of the total polymer.
7. The aqueous dispersion of any one of the preceding embodiments wherein the tetrafluoroethylene core-shell polymer contains a core of a tetrafluoroethylene copolymer, wherein the copolymers are selected from hexafluoropropene, perfluorinated alkyl vinyl ethers, perfluorinated alkyl allyl ether, and wherein the alkyl units may be interrupted once of more than once by oxygen atoms.
8. The aqueous dispersion of any one of the preceding embodiments having a solid content of between 30 and 70% by weight based on the total weight of the dispersion.
9. The aqueous dispersion of any one of the preceding embodiments wherein the tetrafluoroethylene core-shell polymer is obtainable by aqueous emulsion polymerization in the presence of fluorinated emulsifiers and subsequent removal of the fluorinated emulsifiers and, optionally addition of at least one non-fluorinated anionic surfactant, preferably at least one sulfonate surfactant.
10. The aqueous dispersion of any one of the preceding embodiments wherein the fluorinated emulsifier has a molecular weight of less than 1000 g/mole.
11. The aqueous dispersion of any one of the preceding embodiments further comprising at least one anionic sulfonate surfactant.
12. Method of making a core-shell tetrafluoroethylene dispersion according to any one of the preceding embodiments comprising providing a tetrafluoroethylene core-shell polymer obtainable by aqueous emulsion polymerization in the presence of fluorinated emulsifiers and subsequent removal of the fluorinated emulsifiers wherein a non-fluorinated non-ionic emulsifier according to formula (I) is added to the dispersion prior to, during or after the removal of the fluorinated emulsifiers, and wherein the fluorinated emulsifiers correspond to the formula $$Y-R_f-Z-M$$

wherein Y represents hydrogen, Cl or F; $R_f$ represents a linear or branched perfluorinated or partially fluorinated alkylene wherein the alkylene chain may be interrupted once or more than once by oxygen atoms; Z represents an acid anion or a plurality thereof, and M represents a counter cation or a plurality thereof.
13. The method according to embodiment 12, wherein the removal of the fluorinated emulsifiers comprises an anion exchange treatment.
14. The method according to embodiment 13, wherein the non-ionic non-fluorinated emulsifiers are added to the dispersion prior to and/or during the anion exchange treatment.
15. A coating composition comprising the aqueous dispersion according to any one of embodiments 1 to 11.
16. Method of coating an article comprising applying the coating composition of embodiment 15 to a substrate followed by a temperature treatment.
17. An article comprising a coating obtained with a coating composition of embodiment 15.
Test Procedures:
Melt Flow Index (MFI):
Melt flow index was measured with a Göttfert melt indexer according to DIN EN ISO 1133 using a 5 kg load and a temperature of 372° C. (MFI 372/5). The extrusion time was one hour.

Average Particle Size:

Average particle size of polymer particles as polymerized was measured by electronic light scattering using a Malvern Autosizer 2c in accordance with ISO 13321. The average particle sizes are expressed as the Z-average. The Z-average can be expressed as by the equation below:

$$D_z = \frac{\sum S_i}{\sum (S_i / D_i)}$$

Here, $S_i$ is the scattered intensity from particle i and $D_i$ is the diameter of particle i.

Solid Content:

The solid content (fluoropolymer content) of the dispersions was determined gravimetrically according to ISO 12086. A correction for non volatile inorganic salts was not carried out.

Melting Point:

Melting points were determined by DSC (a Perkin Elmer differential scanning calorimeter Pyris 1) according to ASTM D 4591. 5 mg samples were heated at a controlled rate of 10° C./min to a temperature of 380° C. by which the first melting temperature was recorded. The samples were then cooled at a rate of 10° C./min to a temperature of 300° C. and then reheated at 10° C./min to a temperature at 380° C. The melting point observed at the second heating period was recorded and is referred to herein as the melting point of the polymer (melting point of the once molten material).

Viscosity:

The viscosity of the dispersions was measured using a Brookfield Rheometer DV-III, spindle 86 at 20 D/1/s.

Critical Film Thickness (CFT):

A container was filled with the test dispersion. Foam if present was removed using a pipette. A degreased aluminum plate (19×4×4 mm³) was dipped in the dispersion and dried with the plate hanging under an angle of 45°. The plate was allowed to dry for 5 min, after which it was heated at 380° C. during 10 min. The plate was cooled and the coating was evaluated for cracks using a microscope. The maximum crack-fee thickness was measured using a Minitest 4000 thickness meter.

Temperature Transition (VTT): The viscosity temperature transition (VTT) represents the viscosity-temperature dependence of the dispersion. It is obtained by measuring the viscosity of the fluoropolymer dispersion, while heating the sample between 20° C. and 50° C. and checking the viscosity every 1° C. The VTT point is the temperature at which the viscosity reaches again the same value as was measured at 20° C. This means the viscosity of the sample was measured at 20° C. The sample was then heated above 20° C. and the viscosity decreases. At a certain temperature the viscosity of tetrafluoroethylene polymers, in particular PTFE's increases again. The temperature at which the viscosity of the sample increases again to the value the sample had at 20° C. is the VTT.

Surface Tension:

The surface tension was measured by means of a clean, flamed platinum plate, using a tensiometer (Kruess), according to ASTM D1331.

Conductivity:

Conductivity was measured with the 712 Conductometer, supplied by Metrohm AG. In case that the conductivity of the upconcentrated dispersions was less than 1000 mu S/cm, aqueous ammonium sulfate solution (1%) was added to adjust the conductivity to about 1000 µS/cm.

Shear Stability:

150 g dispersion, thermostated to 20° C., were put in a 250 ml standard glass beaker of an inner diameter of 65 mm. The agitation head (S 25 N-25 G) of an Ultra Turrax T25, supplied by Janke & Kunkel, was immersed in the center of the beaker such that the end of the head was 7 mm above the beaker bottom. The Ultra Turrax was switched on at a revolution speed of 8000 rpm. Agitation rendered the surface of the dispersion "turbulent" or "wavy". After 10 to 20 sec, 2.0 g xylene were added drop-wize within less than 10 sec to the agitated dispersion. Time measurement started with the addition of xylene and was stopped when the surface of the agitated dispersion no longer showed visible turbulence. The surface "freezes" or smoothes due to coagulation. Coagulation was accompanied by a characteristic change of sound of the Ultra Turrax. In case that the "surface freezing" could not be observed clearly due to foam formation the time measurement was stopped with the onset of the change of sound. Reported shear stability values in the examples are the average of 5 measurements.

Example 1

Preparation of Seed Latex 100 l deionized water containing 100 g CF3OCF2CF2CF2OCHCF2COOH were fed in a 150 l polymerization vessel. Air was removed by alternating evacuation and pressurizing with nitrogen up to 6 bar. Then 140 g HFP were fed to the vessel and the temperature in the vessel was adjusted to 35° C. The vessel was pressurized with TFE to 15 bar (abs.) after which 100 ml deionized water containing 1.1 g APS, 50 g 25% ammonia solution and 60 mg $CuSO_4 \cdot 5H_2O$ were pumped in the vessel. The polymerization was started by quickly pumping 150 ml deionized water containing 0.5 g $Na_2S_2O_5$ in the vessel. The polymerization temperature and pressure were kept constant. The uptake rate of TFE was adjusted to about 12 kg/h by properly adjusting the speed of agitation. When 11 kg TFE had been consumed, the polymerization was stopped by closing the TFE-feeding and reducing the speed of agitation. The vessel was vented and the resulting dispersion (seed latex) discharged. The dispersion (seed latex) had a solid content of 10% and seed particle size was about 90 nm.

Example 2

Preparation of Core-Shell Tetrafluoroethylene Polymer 20 l of seed latex prepared as described in Example 1 were charged in the 150 l polymerization vessel together with 80 l deionized water containing 100 g CF3OCF2CF2CF2OCHCF2COOH. Air was removed as described in Example 1. The vessel was pressurized with TFE to 15 bar abs. The temperature was adjusted to 42° C. 200 ml aqueous solution containing 0.6 g APS, 60 mg $CuSO_4 \cdot 5H_2O$ and 60 g 25% aqueous ammonia solution were charged into the vessel. The polymerization was initiated by continuously pumping into the vessel an aqueous solution containing 0.15 g azodicarboxyl diamide (ADA) dissolved in 3000 ml deionized water containing 15 ml 10% NaOH. The pumping rate for the first 10 min was 50 ml/min and was then reduced to 15-30 ml/min. Feeding rate and agitation speed were adjusted to achieve an uptake rate for TFE of about 12 kg/h. The polymerization was conducted at constant pressure and temperature. When 22 kg TFE had been consumed, the polymerization was stopped by interrupting the feeding of the ADA-solution and TFE. The vessel was vented and the dispersion was discharged. The dispersion had a solid content of about 21 wt. % and a particle size of about 200 nm. To the dispersion were added 2 wt. % TERGITOL TMN-100X) based on solid content. 100 ml of anion exchange resin Amberlite IRA 402 in the OH-form were added to 1 l of dispersion. The mixture was gently agitated for 2 hour and the exchange resin was filtered off via a glass sieve. The content of fluorinated emulsifier was below 20 ppm.

The dispersion was thermally up-concentrated to a solid content of 58% by evaporation in the presence of TERGITOL TMN-100X as supplied by Dow Chemical as nonionic emulsifier. The content of non-ionic emulsifier based on solid content of the upconcentrated dispersion was 5-7 wt %. If necessary, pH was adjusted to 9 by adding aqueous ammonia. The up-concentrated dispersions were subjected to the shear tests and film forming tests. The results are reported in table 1.

Example 3

Comparative Example

A core-shell polymer with a modified PTFE shell was prepared by using the seed composition of example 1 and subjecting it to the polymerization as described in example 2 with the difference that after a total consumption of 21 kg TFE the ADA feeding was stopped. A solution containing 0.8 g APS, 60 mg $CuSO_4 \cdot 5H_2O$ and 0.7 g 25% aqueous ammonia solution in 150 ml deionized water was charged into the vessel followed by a solution of 0.6 g $Na_2S_2O_5$ in 50 ml deionized water followed by an injection of 190 g HFP in the polymerization vessel. When a total amount of 23 kg TFE was consumed, the polymerization was stopped by closing the TFE-feeding. The vessel was vented and the dispersion discharged. The dispersion was subjected to anion exchange treatment and thermal upconcentration to a solid content of 58% as described in example 2. The particle size was about 200 nm.

Example 4

Comparative Example

Comparative example 2 was repeated except that TRITON X 100 (aromatic non-ionic emulsifier) was used as non ionic emulsifier instead of TERGITOL TMN-100X. The solid content was 58% and the particle size was about 200 nm.

|  | Example 2 | Example 3 (Comparative Example) | Example 4 (Comparative Example) |
| --- | --- | --- | --- |
| Content of fluorinated emulsifier (ppm; mg/g) | 2 | 2 | <1 |
| Viscosity (mPas) (20D 1/s, 20° C.): | 18.6 | 17.9 | 12.9 |
| VTT: | >40° C. | >40° C. | >40° C. |
| pH | 9.6 | 9.6 | 10.2 |
| Conductivity (µS/cm): | 245 | 340 | 1310 |
| Surface tension (mN/m): | 30 | 30 | 34.9 |

-continued

|  | Example 2 | Example 3 (Comparative Example) | Example 4 (Comparative Example) |
| --- | --- | --- | --- |
| Film thickness (µm): | 17 | 8 | 8 |
| Rewetting (%): | 5 | 30 | >30 |
| Shear stability: | >600 s | >600 s | >600 s |

The comparison shows that dispersions according to the present disclosure have superior coating properties as determined by film thickness and rewetting.

Example 5

Example 2 was repeated except that a sulfosuccinate surfactant was added to the dispersion (0.2% by weight, EMULSOGEN SF 8 from Clariant). The shear stability of the dispersion increased (by more than 400% when using butylcarbitol ($C_4H_9(OCH_2CH_2)_2OH$ as test solvent).

The invention claimed is:

1. An aqueous dispersion comprising a tetrafluoroethylene core-shell polymer and at least one non-fluorinated non-ionic surfactant corresponding to the formula:

$$R_1O-[CH_2CH_2O]_n-[R_2O]_m-R_3 \quad (I)$$

wherein $R_1$ is (R')(R'')HC- and wherein R' and R'' are the same or different, linear or branched alkyl groups wherein at least one of R' and R'' is a branched alkyl group and wherein $R_1$ has at least 6 carbon atoms, $R_2$ represents an alkylene unit having 3 or 4 carbon atoms, $R_3$ represents hydrogen, a $C_1$-$C_3$ alkyl group, or a $C_1$-$C_3$ hydroxyalkyl group, n has a value of 0 to 40, m has a value of 0 to 40 and the sum of n+m is at least 2, wherein the core-shell polymer contains an outer shell that has a greater molecular weight than the core and wherein the dispersion is essentially free of fluorinated emulsifiers corresponding to the formula $$Y-R_f-Z-M$$

wherein Y represents hydrogen, Cl or F; $R_f$ represents a linear or branched perfluorinated or partially fluorinated alkylene wherein the alkylene chain may be interrupted once or more than once by oxygen atoms; Z represents an acid anion or a plurality thereof, and M represents a counter cation or a plurality thereof and wherein essentially free means an amount of less than 50 ppm and including 0 ppm based on the weight of the dispersion; and wherein the aqueous dispersion comprises 1 to 12 percent by weight of the non-fluorinated non-ionic surfactant(s) based on the weight of the dispersion and has a shear stability of at least 360 seconds.

2. The aqueous dispersion of claim 1 wherein the outer shell is made of tetrafluoroethylene homopolymer.

3. The aqueous dispersion of claim 1, wherein the tetrafluoroethylene core-shell polymer has an MFI (372/5) of less than 1 g / 10 min.

4. The aqueous dispersion of claim 1, wherein the core-shell polymer has a core containing a tetrafluoroethylene copolymer.

5. The aqueous dispersion of claim 1, wherein the core-shell polymer has a total comonomer content of less than 1 weight percent based on the weight of the total polymer.

6. The aqueous dispersion of claim 1, wherein the tetrafluoroethylene core-shell polymer contains a core of a tetrafluoroethylene copolymer, wherein the copolymers are selected from hexafluoropropene, perfluorinated alkyl vinyl ethers, perfluorinated alkyl allyl ether, and wherein the alkyl units may be interrupted once of more than once by oxygen atoms.

7. The aqueous dispersion of claim 1, further comprising at least one anionic sulfonate surfactant.

8. The aqueous dispersion of claim 1, having a solid content of between 30 and 70% by weight based on the total weight of the dispersion.

9. The aqueous dispersion of claim 1, wherein the tetrafluoroethylene core-shell polymer is obtainable by aqueous emulsion polymerization in the presence of fluorinated emulsifiers and subsequent removal of the fluorinated emulsifiers and optional addition of at least one anionic sulfonate surfactant.

10. The aqueous dispersion of claim 1, wherein the fluorinated emulsifiers have a molecular weight of less than 1000 g /mole.

11. Method of making a core-shell tetrafluoroethylene polymer dispersion according to claim 1, the method comprising providing a tetrafluoroethylene core-shell polymer that contains an outer shell that has a greater molecular weight than the core, obtained by aqueous emulsion polymerization in the presence of a fluorinated emulsifier and subsequent removal of the fluorinated emulsifiers by anion exchange treatment such that dispersion is essentially free of the fluorinated emulsifier, wherein the non-fluorinated emulsifier according to formula (I) is added to the dispersion either as stabilizing emulsifiers in the anion exchange treatment or after the anion exchange treatment or both, and wherein the fluorinated emulsifier corresponds to the formula $$Y-R_f-Z-M$$

wherein Y represents hydrogen, Cl or F; $R_f$ represents a linear or branched perfluorinated or partially fluorinated alkylene wherein the alkylene chain may be interrupted once or more than once by oxygen atoms; Z represents an acid anion or a plurality thereof, and M represents a counter cation or a plurality thereof.

12. A coating composition comprising the aqueous dispersion according to claim 1.

13. Method of coating an article comprising applying the coating composition of claim 12 to a substrate followed by a temperature treatment.

14. An article comprising a coating obtained with a coating composition of claim 12.

15. The aqueous dispersion of claim 1, wherein R1 has 8 to 18 carbon atoms.

16. The aqueous dispersion of claim 1, wherein both R' and R" are branched alkyl groups.

17. The aqueous dispersion of claim 1, wherein the aqueous dispersion has a critical film thickness of at least 10 microns.

18. The aqueous dispersion of claim 17, wherein the aqueous dispersion has a critical film thickness of at least 15 microns.

* * * * *